United States Patent
Rivera et al.

(10) Patent No.: US 6,447,566 B1
(45) Date of Patent: Sep. 10, 2002

(54) AIR FILTRATION SYSTEM WITH RECESSED FILTER AND EDGE BANDING

(75) Inventors: Samuel Rivera, Clarksville, TN (US); Simon D. Ladd, Hopkinsville, KY (US)

(73) Assignee: Freudenberg Nonwovens Limited Partnership, Durham, NC (US)

( * ) Notice: Subject to any disclaimer, the term of this patent is extended or adjusted under 35 U.S.C. 154(b) by 0 days.

(21) Appl. No.: 09/758,682

(22) Filed: Jan. 11, 2001

Related U.S. Application Data

(60) Provisional application No. 60/213,060, filed on Jun. 21, 2000, and provisional application No. 60/249,949, filed on Nov. 20, 2000.

(51) Int. Cl.$^7$ .................... B01D 50/00; B01D 46/52
(52) U.S. Cl. .............. 55/482; 55/495; 55/497; 55/499; 55/500; 55/501; 55/502; 55/521; 55/DIG. 31
(58) Field of Search .................. 55/482, 486, 485, 55/487, 488, 489, 490, 495, 497, 499, 500, 501, 502, 509, 511, 521, 529, DIG. 31

(56) References Cited

U.S. PATENT DOCUMENTS

| | | | | |
|---|---|---|---|---|
| 2,130,107 A | * | 9/1938 | Somers | 55/499 |
| 2,423,741 A | * | 7/1947 | Vokes et al. | 55/500 |
| 3,354,622 A | * | 11/1967 | Murphy, Jr. | 55/502 |
| 3,494,113 A | * | 2/1970 | Kinney | 55/497 |
| 3,631,582 A | * | 1/1972 | Lucas | 55/521 |
| 4,340,402 A | * | 7/1982 | Catron | 55/487 |
| 4,685,944 A | * | 8/1987 | Allan et al. | 55/500 |
| 5,080,699 A | | 1/1992 | Ho et al. | 55/179 |
| 5,397,632 A | * | 3/1995 | Murphy, Jr. et al. | 55/521 |
| 5,399,180 A | | 3/1995 | Kopp | 55/493 |
| 5,423,892 A | | 6/1995 | Kahlbaugh et al. | 55/320 |
| 5,531,892 A | * | 7/1996 | Duffy | 55/497 |
| 5,538,545 A | * | 7/1996 | Dauber et al. | 55/487 |
| 5,571,300 A | | 11/1996 | Stemmer | 55/793 |
| 5,782,944 A | * | 7/1998 | Justice | 55/495 |
| 5,824,394 A | * | 10/1998 | Kinoshita et al. | 428/195 |
| 5,840,094 A | | 11/1998 | Osendorf et al. | 55/497 |
| 5,853,445 A | * | 12/1998 | Wong et al. | 55/502 |
| 5,922,096 A | | 7/1999 | Stemmer | 55/483 |
| 5,944,860 A | | 8/1999 | Mack et al. | 55/492 |
| 5,976,225 A | * | 11/1999 | Nystrom et al. | 55/487 |
| 6,007,596 A | | 12/1999 | Rosen | 55/491 |
| 6,099,612 A | * | 8/2000 | Bartos | 55/482 |
| 6,156,089 A | * | 12/2000 | Stemmer et al. | 55/486 |
| 6,224,655 B1 | * | 5/2001 | Messier | 55/486 |

FOREIGN PATENT DOCUMENTS

| | | | | |
|---|---|---|---|---|
| EP | 0 560 012 A1 | * | 9/1993 | 55/DIG. 31 |
| JP | 6-269624 | * | 9/1994 | 55/497 |

* cited by examiner

Primary Examiner—Duane Smith
Assistant Examiner—Jason M. Greene
(74) Attorney, Agent, or Firm—Weingarten, Schurgin, Gagnebin & Lebovici LLP

(57) ABSTRACT

A filtration system has a main filter assembly having a frame and filter media comprising pleated sections arranged in a row in V shapes within the frame. The filter media is spaced from an upstream face of the frame a distance sufficient to prevent blinding of the filter media by an upstream filter media, thereby eliminating a filtration stage and reducing the volume of the filtration system. Filter media alignment members disposed within the frame assist in holding the filter media sections in alignment within the frame. In another embodiment, flexible strips of edge banding, preferably of a filter material, are affixed to adjacent upper and lower longitudinal edges of the sections of the filter media. The edge banding minimizes pressure drop across the filter and is simpler and less costly to manufacture.

31 Claims, 9 Drawing Sheets

US 6,447,566 B1

AIR FILTRATION SYSTEM WITH RECESSED FILTER AND EDGE BANDING

CROSS REFERENCE TO RELATED APPLICATIONS

This application claims the benefit under 35 U.S.C. § 119(e) of U.S. Provisional Application No. 60/213,060, filed Jun. 21, 2000, and U.S. Provisional Application No. 60/249, 949, filed on Nov. 20, 2000, the disclosures of which are incorporated by reference herein.

STATEMENT REGARDING FEDERALLY SPONSORED RESEARCH OR DEVELOPMENT

N/A

BACKGROUND OF THE INVENTION

Certain HVAC applications use air filtration systems incorporating several stages of filtration. In a first stage, a prefilter is used to trap particles in the range of 5 microns and greater. In a second stage, a second or main filter is used to trap smaller particles in the range of 3 to 5 microns, and so on depending on the application. The main filter assembly includes sections of filter media that have been arranged in an accordion fashion to from a row of aligned V shapes. Adjacent sections are held in place by longitudinal bridging strips that bridge adjacent end faces. The frame and bridging strips are typically formed from a molded or extruded plastic material. Other stages of filtration may be provided downstream of the main filter assembly.

In these multi-stage filter systems, the prefilter cannot be butted directly against the main filter to prevent blinding off of the main filter, which would increase the resistance to air flow and decrease service life. The prefilter is thus typically provided as a separate assembly that is located upstream of the main filter assembly. The prefilter assembly accordingly takes up a whole stage of filtration.

SUMMARY OF THE INVENTION

The present invention provides a system for butting up filters together while keeping a sufficient separation, preferably 1 inch, between them necessary for optimum performance. The present invention accordingly eliminates a stage of filtration and reduces the volume taken by the additional stage of filtration.

In a further embodiment, the present invention also provides a filtration system incorporating edge banding on adjacent V-shaped sections of filter media in the main filter assembly. The edge banding comprises strips of a strong sheet media, for example, a nonwoven polyester material or extruded, calendered polymers or plastics. The strips are preferably adhesively bonded along the edges of adjacent V-shaped sections.

The edge banding eliminates the need for extruded plastic bridging strips, which increase the pressure drop across the filter. Accordingly, the present invention results in a lesser pressure drop across the filter and is simpler and less costly to manufacture.

DESCRIPTION OF THE DRAWING

The invention will be more fully understood from the following detailed description taken in conjunction with the accompanying drawings in which.

DETAILED DESCRIPTION OF THE INVENTION

Figure 1:
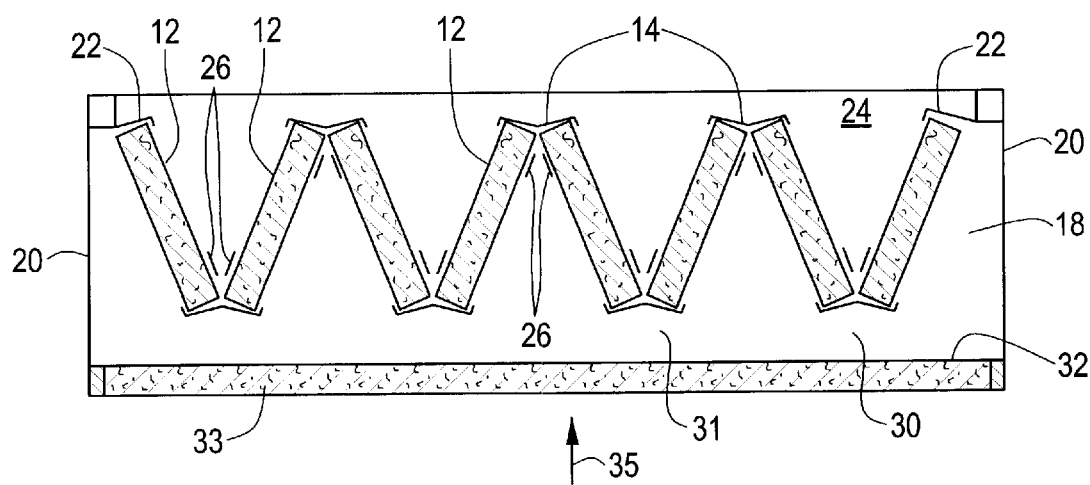
FIG. 1 is a cross-sectional view of a first embodiment of a filtration system of the present invention taken along line I—I of FIG. 3.
Figure 2:
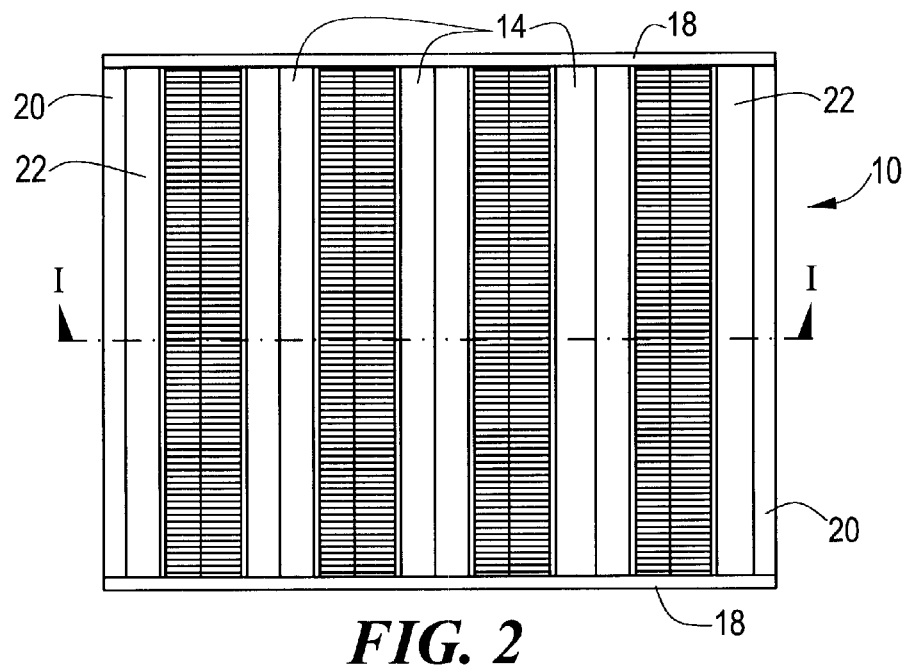
FIG. 2 is a top plan view of the filtration system of FIG. 1.
Figure 3:
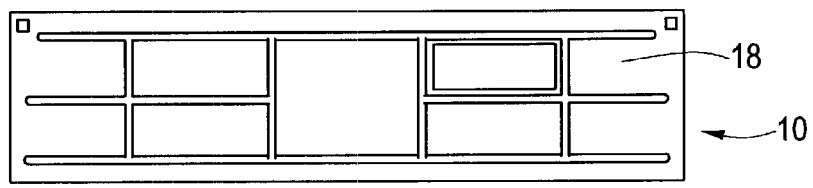
FIG. 3 is an end view of the filtration system of FIG. 1.
Figure 4:
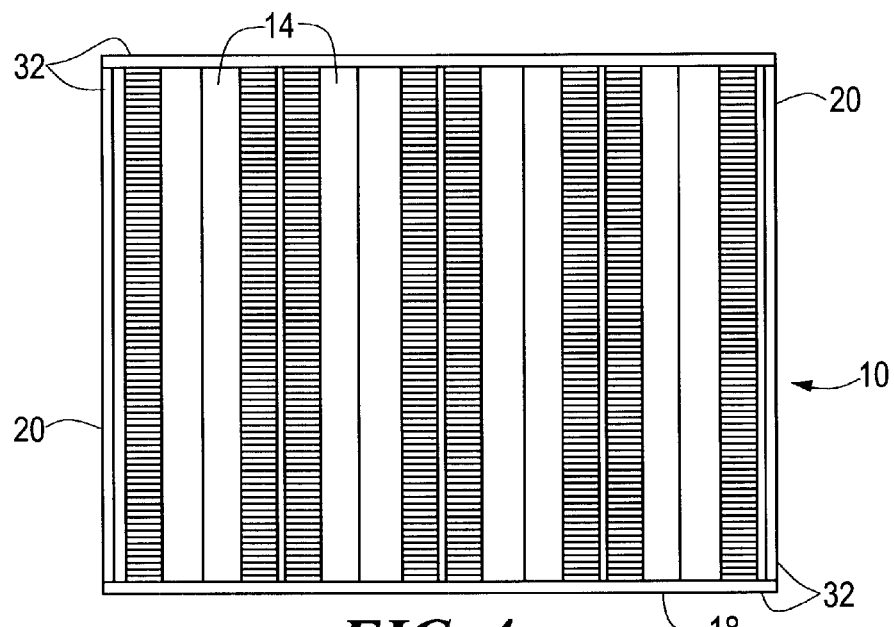
FIG. 4 is a bottom plan view of the filtration system of FIG. 1.
Figure 5:
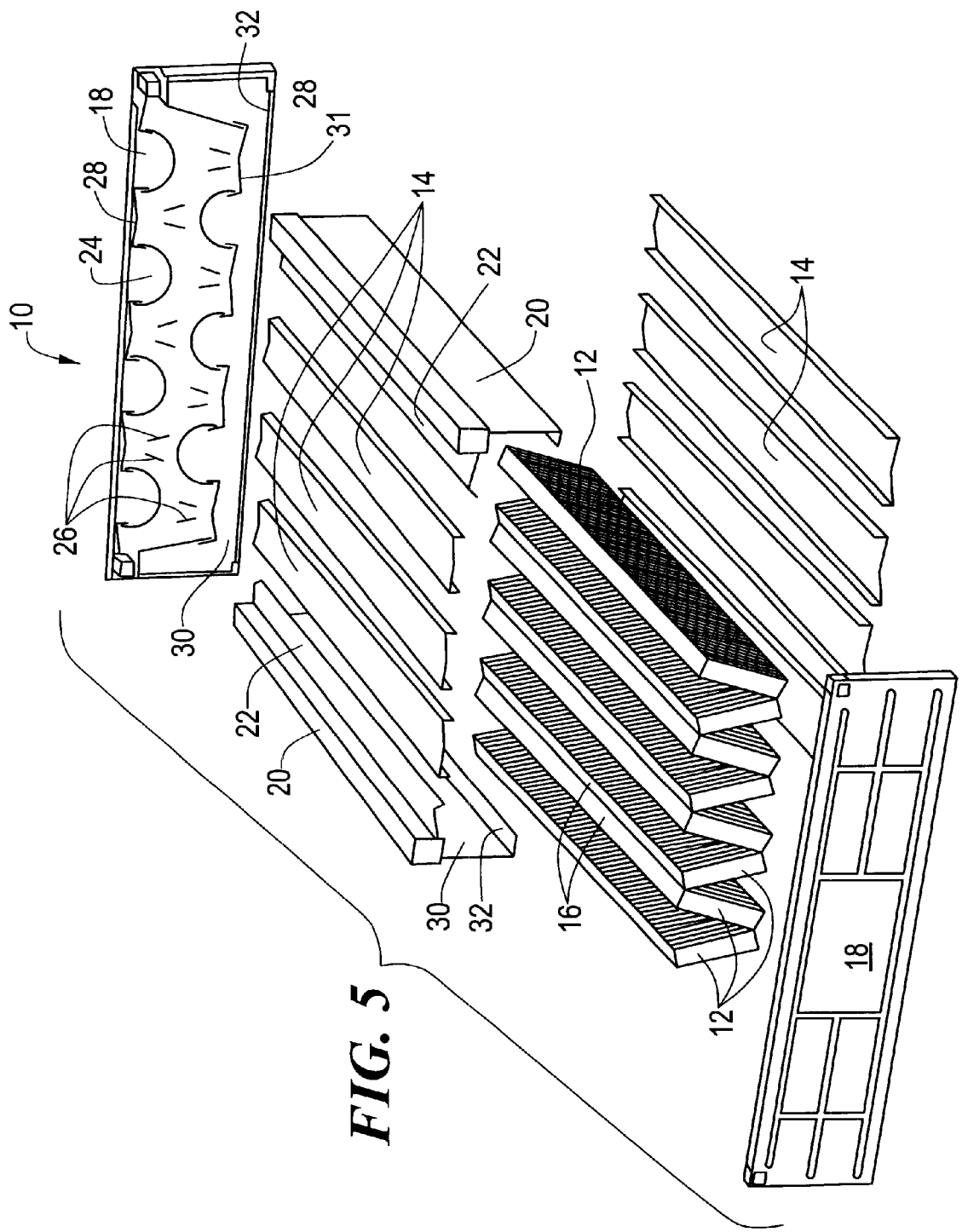
FIG. 5 is an exploded view of the filtration system of FIG. 1.
Figure 6:
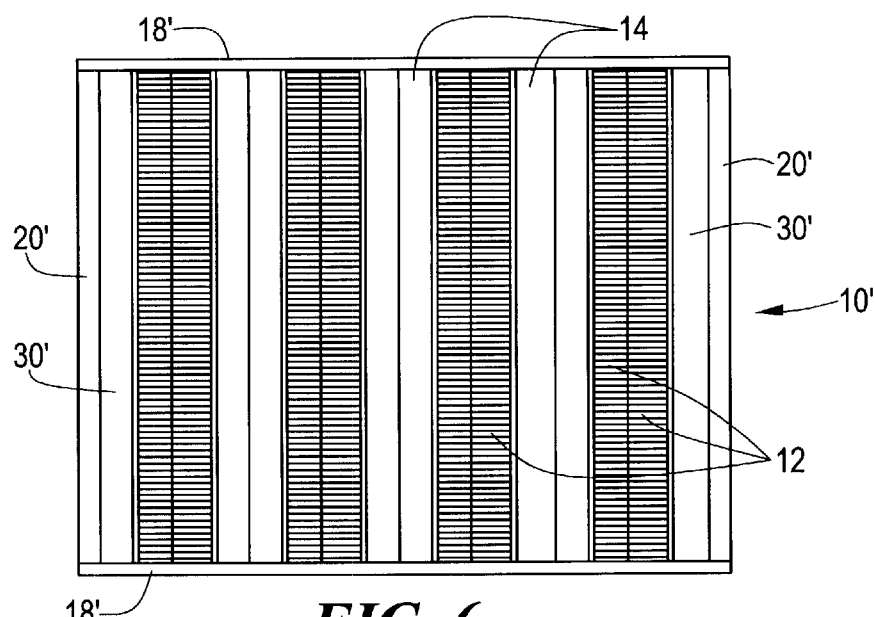
FIG. 6 is a top plan view of a further embodiment of a filtration system of the present invention.
Figure 7:
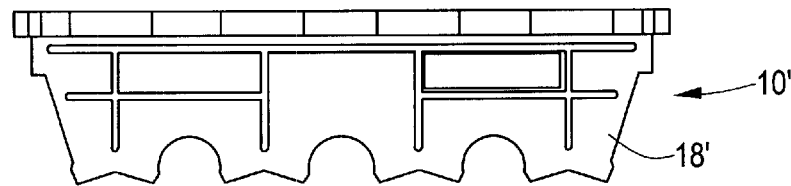
FIG. 7 is an end view of the filtration system of FIG. 6.
Figure 8:
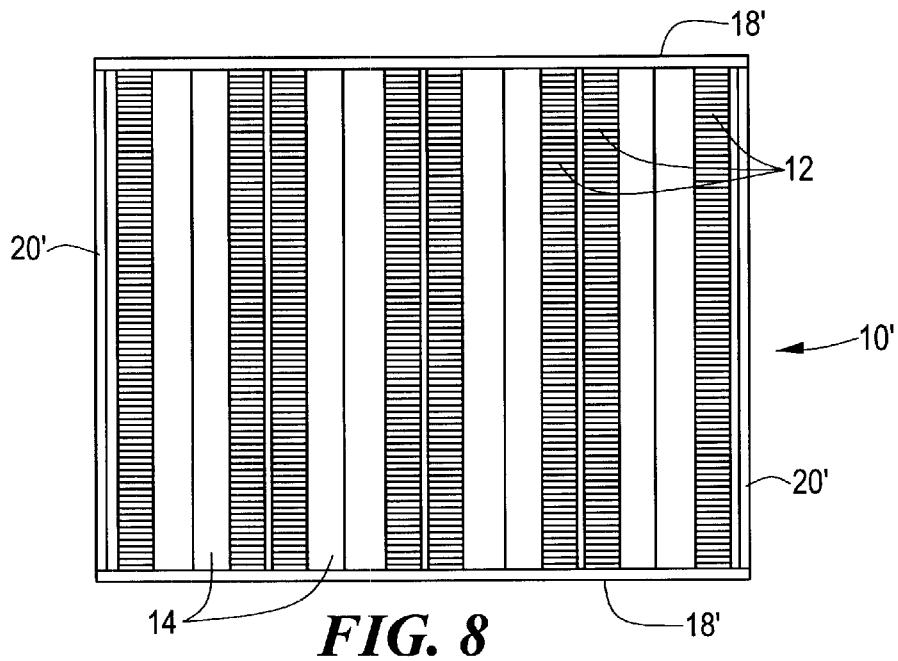
FIG. 8 is a bottom plan view of the filtration system of FIG. 6.

A filtration system of the present invention is illustrated in FIGS. 1–9. The filtration system has a frame 10, preferably formed of a plastic material, in which sections 12 of filter media are placed. The filter media may be, for example, a non-woven polyester material. Each section of filter media comprises a sheet that has been pleated or folded in an accordion fashion and mounted in the frame adjacent to other sections at an angle to form a row of aligned V-shapes. Adjacent sections 12 are held in place by stiff longitudinal bridging strips 14 that bridge adjacent end faces 16 of the section. The bridging strips 14 may be bent along their longitudinal length to accommodate the angled disposition of the end faces of adjacent sections. The bridging strips are relatively stiff structural members and they hold adjacent filter media sections spaced slightly apart (see FIG. 1).

In a first embodiment, illustrated in FIGS. 1–5, the frame 10 includes two opposed end walls 18 and two opposed side walls 20 that are joined to form a rectangular, generally square, configuration. Two side bridging members 22 attach the outermost filter media sections to the side walls. The side bridging members 22 may be integrally formed with the side walls 20 or may be formed separately from the side walls and subsequently fastened to the side walls in any suitable manner.

The inside faces 24 of the end walls 18 include inwardly facing linear protrusions 26 angled to have the same orientation as the V-shapes of the aligned filter media sections 12. The filter media sections 12 are aligned and retained in place against these protrusions when the entire filter system is assembled. The inside faces also include inwardly facing lips 28 that receive the bridging strips. The end walls, side walls, and filter media sections are fixed together in any suitable manner. For example, the filter media sections may be glued to the side walls. The end panels are then filled with an adhesive, such as a polyurethane, and set onto the filter media sections. Any other suitable manner of assembling the filtration system, for example, with ultrasonic welding, may be used, as would be known in the art.

The side walls and end walls of the frame include extending wall portions 30 sized to form a recess 31. A prefilter assembly 33 (see FIGS. 1 and 9) fits adjacent the recess. For example, the end or side walls may include inwardly facing lips 32. The prefilter assembly fits against the lips and is attached to the frame by clips, such as the clip 37 illustrated in FIG. 10. A variety of suitable clips are commercially available. In this configuration, the prefilter is retained upstream of the filter media in a spaced relation to the filter media, such that the filter media is not blinded by the prefilter. A recess depth, or spacing between the prefilter assembly and the filter media, of 1 inch is suitable. The direction of air flow is indicated by the arrow 35 in FIG. 1.

In a second embodiment, illustrated in FIGS. 6–9, the frame 10' includes two opposed end walls 18' and two opposed side walls 20' that join the ends of the end walls to form a rectangular, generally square, configuration. Thus, the side walls 20' do not extend to the same depth as the end walls 18' as in the first embodiment. The end walls 18' of the second embodiment include protrusions 26' for aligning the filter media sections 12 and lips 28' for receiving the bridging sections 14, as discussed above in connection with the first embodiment.

Figure 9:
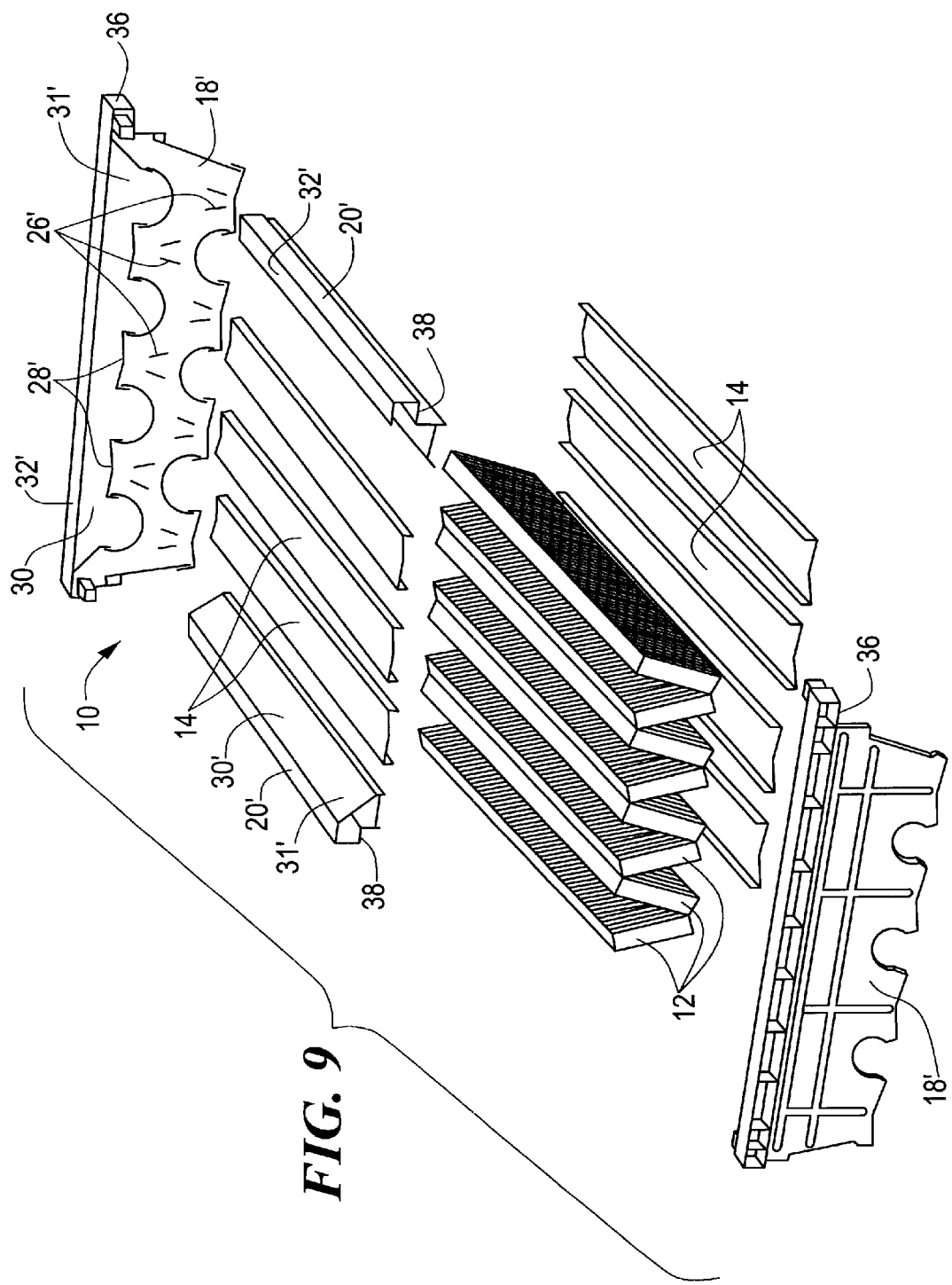
FIG. 9 is a top plan view of a prefilter for use with the filtration system of the present invention.
Figure 10:
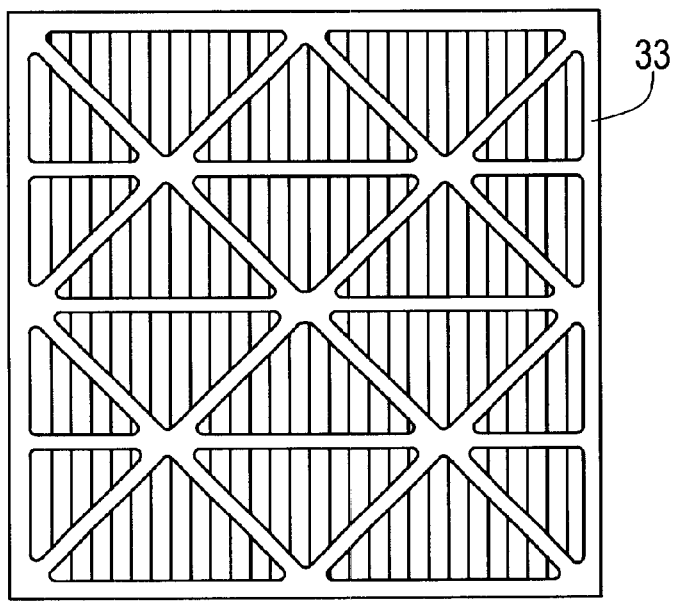
FIG. 10 is a side view of a clip for use with the prefilter of FIG. 9.
Figure 11:
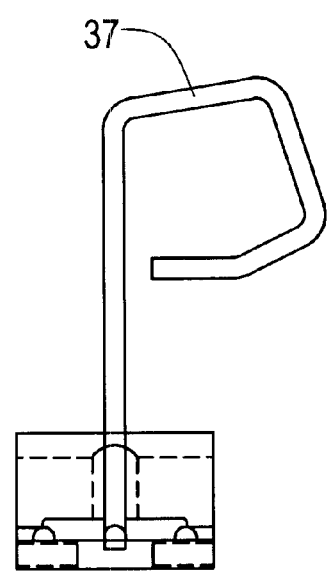
FIG. 11 is an exploded view of the filtration system of FIG. 6.

The end walls 18' and side walls 20' of the frame 10' include extending wall portions 30' sized to form a recess 31', similar to the first embodiment. A recess depth of 1 inch is suitable. The extending wall portions 30' of the side walls 20' may be sloped, as best indicated in FIG. 9, to aid in directing the air flow through the filtration system. The prefilter assembly rests on top of surfaces 32'. The end walls 18' and side walls 20' may include outwardly facing recesses 36 or surfaces 38 for receiving clips or another suitable fastening device to attach the prefilter assembly.

In this manner, the prefilter does not constitute a separate filtration stage incorporating a large assembly maintained at the proper spacing from the main filter assembly. The volume of the filtration system is concomitantly reduced.

Figure 12:
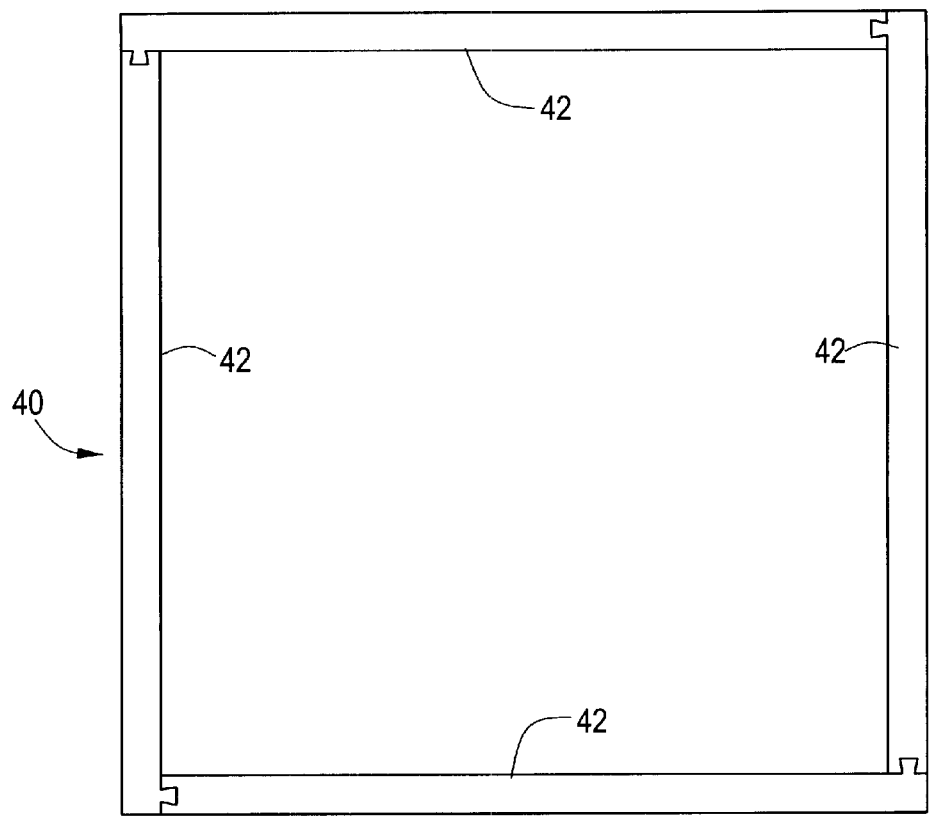
FIG. 12 is a top plan view of a prefilter extension frame according to the present invention.
Figure 14:
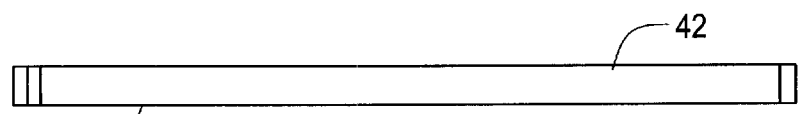
FIG. 14 is a side view of the segment of FIG. 13.
Figure 13:
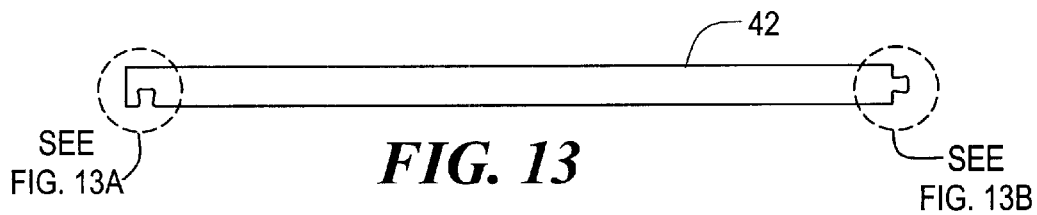
FIG. 13 is a top plan view of a segment of the prefilter extension frame of FIG. 12.
Figure 13A:
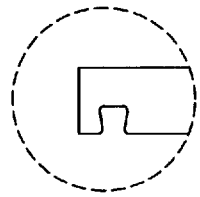
FIGS. 13A and 13B are partial enlarged views of ends of the segment of FIG. 13.
Figure 13B:
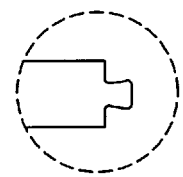
Figure 15:
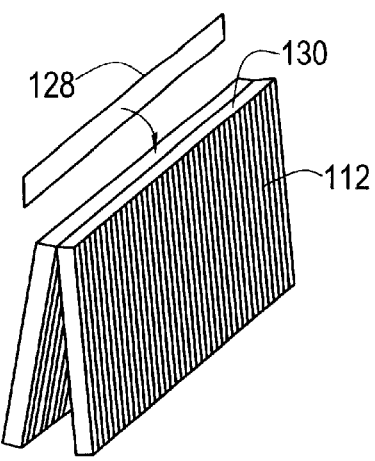
FIG. 15 is an isometric exploded view of a further embodiment utilizing a filter media section and strip of edge banding according to the present invention.
Figure 16:
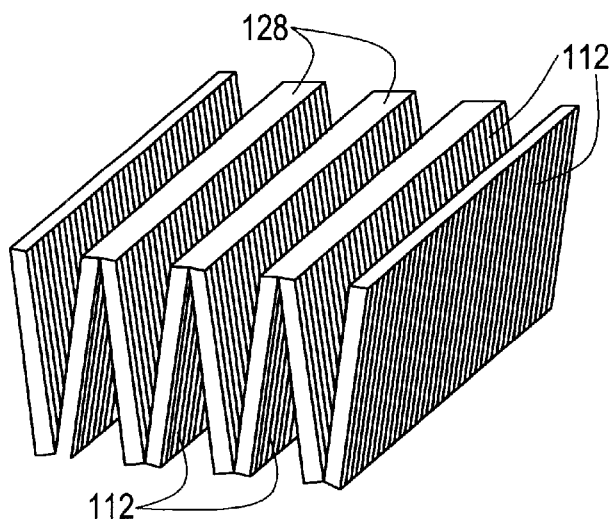
FIG. 16 is an isometric view of a row of filter media sections and strips of edge banding according to the present invention.
Figure 17:
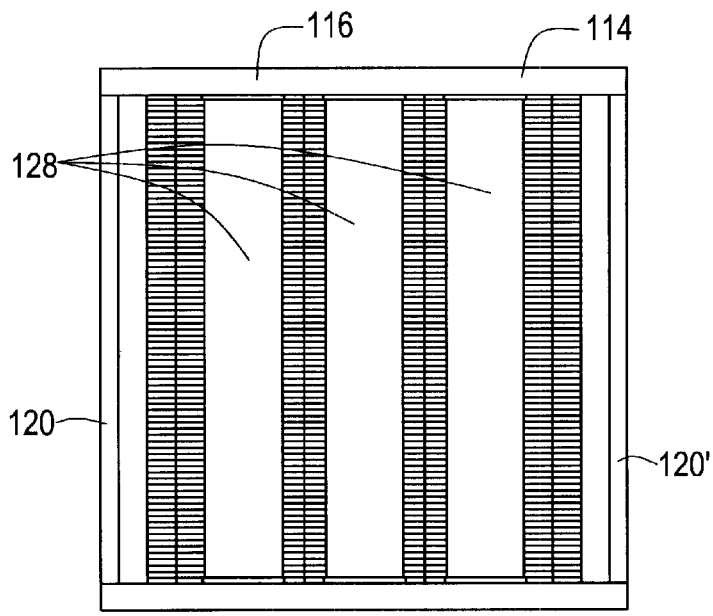
FIG. 17 is a top plan view of a filtration system with edge banding according to the present invention.
Figure 18:
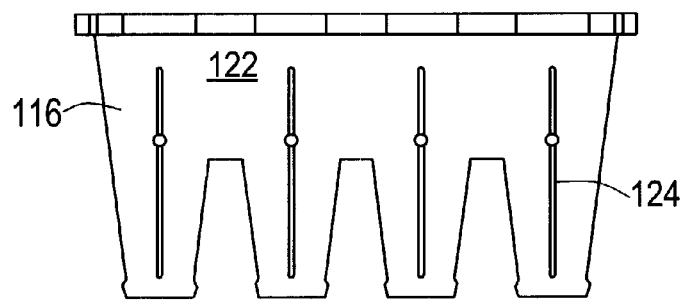
FIG. 18 is an end view of the filtration system with edge banding of FIG. 17.
Figure 19:
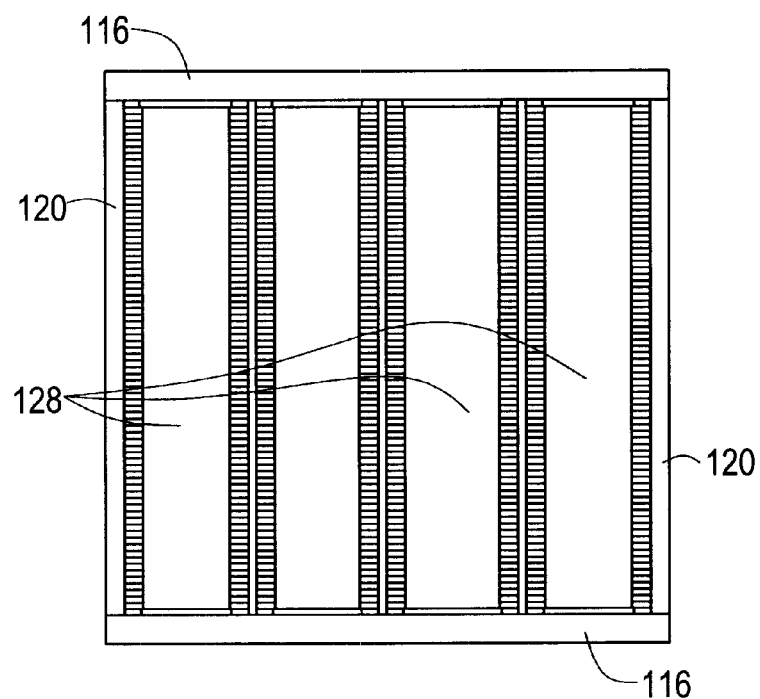
FIG. 19 is a bottom plan view of the filtration system with edge banding of FIG. 3.
Figure 20:
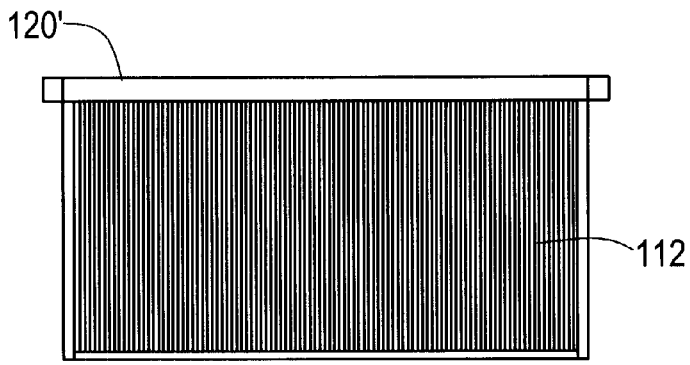
FIG. 20 is a side view of the filtration system with edge banding of FIG. 17.

In a further embodiment, a prior art main filter assembly may be retrofitted with a gasket 40, illustrated in FIGS. 12–14. The gasket, formed for example of closed cell neoprene, may comprise four linear segments 42 interlocked or otherwise attached at the corners in a square or rectangular configuration. One face 44 of the gasket is then attached, for example, with adhesive, or in any other suitable manner, to the upstream face of an existing frame. The gasket has a suitable thickness, such as 1 inch, to space the prefilter assembly from the filter media in the existing frame. The prefilter assembly may be clipped to the gasket in any suitable manner, as discussed above.

A further embodiment of the filtration system of the present invention is illustrated in FIGS. 15–20. As discussed above, the filtration system includes a main filter assembly having sections 112 of filter media that are arranged in accordion fashion to form a row of aligned V shapes. The sections are mounted within a frame 114 that includes two opposed end walls 116 and two opposed side walls 120 that are joined to form a square or rectangular configuration. The inside faces 122 of the end walls 116 typically include inwardly facing protrusions 124, which aid in the alignment and retention of the filter media sections 112 when the entire filter system is assembled.

Adjacent sections 112 of filter media are held in place by longitudinal strips of edge banding 128 that bridge adjacent end faces 130 of the sections 112. The edge banding is a flexible, thin, sheet material or media, for example, about 0.5 mm thick, although the exact thickness can vary. Preferably, the strips of edge banding are bonded using, for example, a polyurethane adhesive to the end faces. Any other suitable manner of affixing the edge banding to the end faces may be employed, as would be recognized by those of skill in the art. The edge banding allows the filter media sections to abut each other at adjacent corners. In contrast, the structural bridging strips hold adjacent sections spaced slightly apart. Also, the edge banding allows the sections to be held at a closer angle. Thus, the edge banding allows a denser spacing of the filter media sections within the frame, resulting in an increase in surface area.

The edge banding may be formed from a variety of sheet media. For example, a filter media material may be used, such as a nonwoven polyester, which may also comprise the material of the filter sections. The edge banding preferably, however, is stronger than the filter sections. For example, the edge banding may have a density of 450 g/cc. Typical filter sections have a density of 115 g/cc. Alternatively, the edge banding may be formed of a flexible sheet material such as an extruded polyester sheet or a plastic material such as ABS. The sheet media may be breathable, which further minimizes resistance to air flow therethrough. In this manner, the strips of edge banding are able to assist in stabilizing and retaining the sections within the frame while minimizing the pressure drop across the filter.

In typical filtration systems, three strips of edge banding are provided on a first or top side and four strips of edge banding are provided on the opposite or bottom side. It will be appreciated, however, that any suitable number of strips of edge banding may be provided, depending on the configuration of the particular filtration system. It will also be appreciated that the configuration- of the filtration system may be different from the particular filtration system illustrated in the embodiment described herein.

It will be appreciated that the filtration system with recess of FIGS. 1–9 may incorporate the edge-banded filtration system of FIGS. 15–20. The invention is not to be limited by what has been particularly shown and described, except as indicated by the appended claims.

What is claimed is:

1. A filtration system comprising:
   a frame having two opposed end walls and two opposed side walls arranged in a rectangular configuration, the end walls and side walls including edges that define an upstream face;
   a prefilter attached to the upstream face of the frame; and
   filter media comprising sections arranged in a row of v shapes, each section extending longitudinally between the opposed end walls and in alignment with the opposed side walls, the filter media fixedly retained within the frame and spaced from the upstream face a distance sufficient to prevent blinding of the filter media by the prefilter.

2. The filtration system of claim 1, further comprising filter media alignment members disposed on the opposed end walls to hold the filter media sections in alignment between the opposed end walls, the alignment members located to space the filter media from the upstream face.

3. The filtration system of claim 2, wherein the filter media alignment members comprise inwardly facing protrusions formed on the opposed end walls.

4. The filtration system of claim 3, wherein the protrusions are oriented in alignment with the V shapes of the sections of the filter media.

5. The filtration system of claim 1, wherein the filter media is spaced from the upstream face by approximately one inch.

6. The filtration system of claim 1, wherein the side walls of the frame further include side bridging members disposed to retain outermost sections of the filter media within the frame.

7. The filtration system of claim 1, further comprising bridging members disposed over adjacent longitudinal edges of the sections of the filter media.

8. The filtration system of claim 1, further comprising flexible strips of edge banding affixed to adjacent longitudinal edges of the V-shaped sections of the filter media.

9. The filtration system of claim 1, wherein the end walls and the side walls extend above the filter media to form a recess.

10. The filtration system of claim 10, wherein the prefilter is attached to the frame by a clip mechanism.

11. The filtration system of claim 1, further comprising a gasket affixed to t he upstream face of the frame.

12. A filtration system comprising:
a frame having two opposed end walls and two opposed side walls arranged in a rectangular configuration, the end walls and side walls including edges that define an upstream face;
filter media comprising sections arranged in a row of V shapes, each section extending longitudinally between the opposed end walls and in alignment with the opposed side walls and supported solely at the end walls; and
flexible strips of edge banding affixed to adjacent upper and lower longitudinal edges of the sections of the filter media.

13. The filtration system of claim 12, wherein the edge banding comprises a filter media material.

14. The filtration system of claim 12, wherein the edge banding has a greater density than the filter media comprising the V-shaped sections.

15. The filtration system of claim 12, wherein the edge banding comprises a non-woven polyester.

16. The filtration system of claim 12, wherein the edge banding comprises a flexible plastic material.

17. The filtration system of claim 11, wherein the edge banding comprises an extruded polyester sheet.

18. The filtration system of claim 12, wherein the edge banding is adhesively bonded to the sections.

19. The filtration system of claim 12, wherein the filter media is spaced from the upstream face a distance sufficient to prevent blinding of the filter media by an upstream filter media.

20. A filtration system comprising:
a frame having two opposed end walls and two opposed side walls arranged in a rectangular configuration, the end walls and side walls including edges that define a planar, outer upstream face;
filter media comprising sections arranged in a row in V shapes, each section extending longitudinally between the opposed end walls and in alignment with the opposed side walls, the filter media fixedly retained within the frame; and
a gasket fixedly attached to the upstream face of the frame to define a recess separating the filter media and an upstream filter media, the gasket having a planar outer downstream face in abutting contact with the planar, outer upstream face of the frame.

21. The filtration system of claim 20, wherein the gasket comprises a rectangular frame formed of four linear segments interlocked at corners.

22. The filtration system of claim 20, wherein the gasket comprises rubber.

23. The filtration system of claim 1, wherein each section of filter media comprises a pleated sheet.

24. The filtration system of claim 12, wherein the edge banding comprises a breathable material.

25. The filtration system of claim 12, wherein the edge banding comprises a material that is stronger than the filter media comprising the V-shaped sections.

26. A filtration system for use with a prefilter, the prefilter having a prefilter frame arranged in a rectangular configuration, the prefilter frame having a planar, outer downstream face, a prefilter filter media disposed within the prefilter frame, the filtration system comprising:
a main frame having two opposed end walls and two opposed side walls arranged in a rectangular configuration, the end walls and side walls including upstream edge surfaces arranged in a rectangular configuration and forming a planar, upstream, outwardly facing rectangular face that conforms to the planar, outer downstream face of the prefilter frame members to abut against and in contact with the planar, outer downstream face of the prefilter assembly; and
main filter media comprising sections arranged in a row of V shapes, each section extending longitudinally between the opposed end walls and in alignment with the opposed side walls, the main filter media fixedly retained within the main frame and spaced from the upstream face a distance sufficient to prevent blinding of the filter media by the prefilter and defining a recess between the main filter media and the upstream face, the recess being free of filter media.

27. A filtration system comprising:
a frame having two opposed end walls and two opposed side walls arranged in a rectangular configuration, the end walls and side walls including edges that define a planar, outer upstream face;
an upstream filter assembly attachable to the upstream face of the frame, the upstream filter assembly having a planar, outer downstream face configured for abutting contact with the planar, outer upstream face of the frame; and
filter media comprising sections arranged in a row of V shapes, each section extending longitudinally between the opposed end walls and in alignment with the opposed side walls, the filter media fixedly retained within the frame and spaced from the upstream face a distance sufficient to prevent blinding of the filter media by the upstream filter assembly.

28. The filtration system of claim 27, wherein the upstream filter assembly comprises a prefilter attachable to the upstream face of the frame.

29. The filtration system of claim 27, wherein the outer upstream face of the frame comprises a planar peripheral surface having a defined configuration, and the outer downstream face of the upstream filter assembly comprises a planar peripheral surface having a configuration that matches the defined configuration of the upstream face of the frame.

30. The filtration system of claim 27, wherein the side walls and the end walls of the frame form a recess between the filter media and the upstream face of the frame, the recess being free of filter media.

31. A filtration system comprising:

a frame having two opposed end walls and two opposed side walls arranged in a rectangular configuration, the end walls and side walls including edges that define a planar, outer upstream face configured for contacting abutment with a corresponding planar, downstream face of an upstream filter assembly; and filter media comprising sections arranged in a row of V shapes, each section extending longitudinally between the opposed end walls and in alignment with the opposed side walls, the filter media fixedly retained within the frame and spaced from the upstream face a distance sufficient to prevent blinding of the filter media by the upstream filter assembly abutting the upstream face of the frame, the end walls and the side walls extending above the filter media to fort a recess between the filter media and the upstream face, the recess being free of filter media.

* * * * *

UNITED STATES PATENT AND TRADEMARK OFFICE
CERTIFICATE OF CORRECTION

PATENT NO. : 6,447,566 B1
DATED : September 10, 2002
INVENTOR(S) : Samuel Rivera et al.

It is certified that error appears in the above-identified patent and that said Letters Patent is hereby corrected as shown below:

Column 4,
Line 64, "v" should read -- V --;

Column 5,
Line 32, "claim 10" should read -- claim 1 --;
Line 35, "t he" should read -- the -- ;
Line 40, "face;" should read -- face, the edges of the frame defining an upstream interior region free of supporting elements; --;
Line 41, "sections arranged in" should read -- sections, each section pleated in an accordian fashion, the sections arranged to form --;
Line 58, "11" should read -- 12 --;

Column 6,
Line 10, "media," should read -- media by a distance sufficient to prevent blinding of the filter media by the upstream filter media, --; and Column 8,
Line 11, "fort" should read -- form --.

Signed and Sealed this

Sixteenth Day of December, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,447,566 B1  Page 1 of 1
DATED : September 10, 2002
INVENTOR(S) : Samuel Rivera et al.

It is certified that error appears in the above-identified patent and that said Letters Patent is hereby corrected as shown below:

Column 4,
Line 64, "v" should read -- V --;

Column 5,
Line 32, "claim 10" should read -- claim 1 --;
Line 35, "t he" should read -- the -- ;
Line 40, "face;" should read -- face, the edges of the frame defining an upstream interior region free of supporting elements; --;
Line 41, "sections arranged in" should read -- sections, each section pleated in an accordion fashion, the sections arranged to form --;
Line 58, "11" should read -- 12 --;

Column 6,
Line 10, "media," should read -- media by a distance sufficient to prevent blinding of the filter media by the upstream filter media, --; and Column 8,
Line 11, "fort" should read -- form --.

This certificate supersedes Certificate of Correction issued December 16, 2003.

Signed and Sealed this

Seventeenth Day of February, 2004

JON W. DUDAS
*Acting Director of the United States Patent and Trademark Office*